Dec. 10, 1968 W. MAASBERG ET AL 3,415,271
VALVE ASSEMBLY FOR RECIPROCATING PUMPS AND THE LIKE
Filed Dec. 17, 1965 2 Sheets-Sheet 1

WOLFGANG MAASBERG
WILLY HEINRICH
*INVENTORS*

BY *Karl F. Ross*
*Attorney*

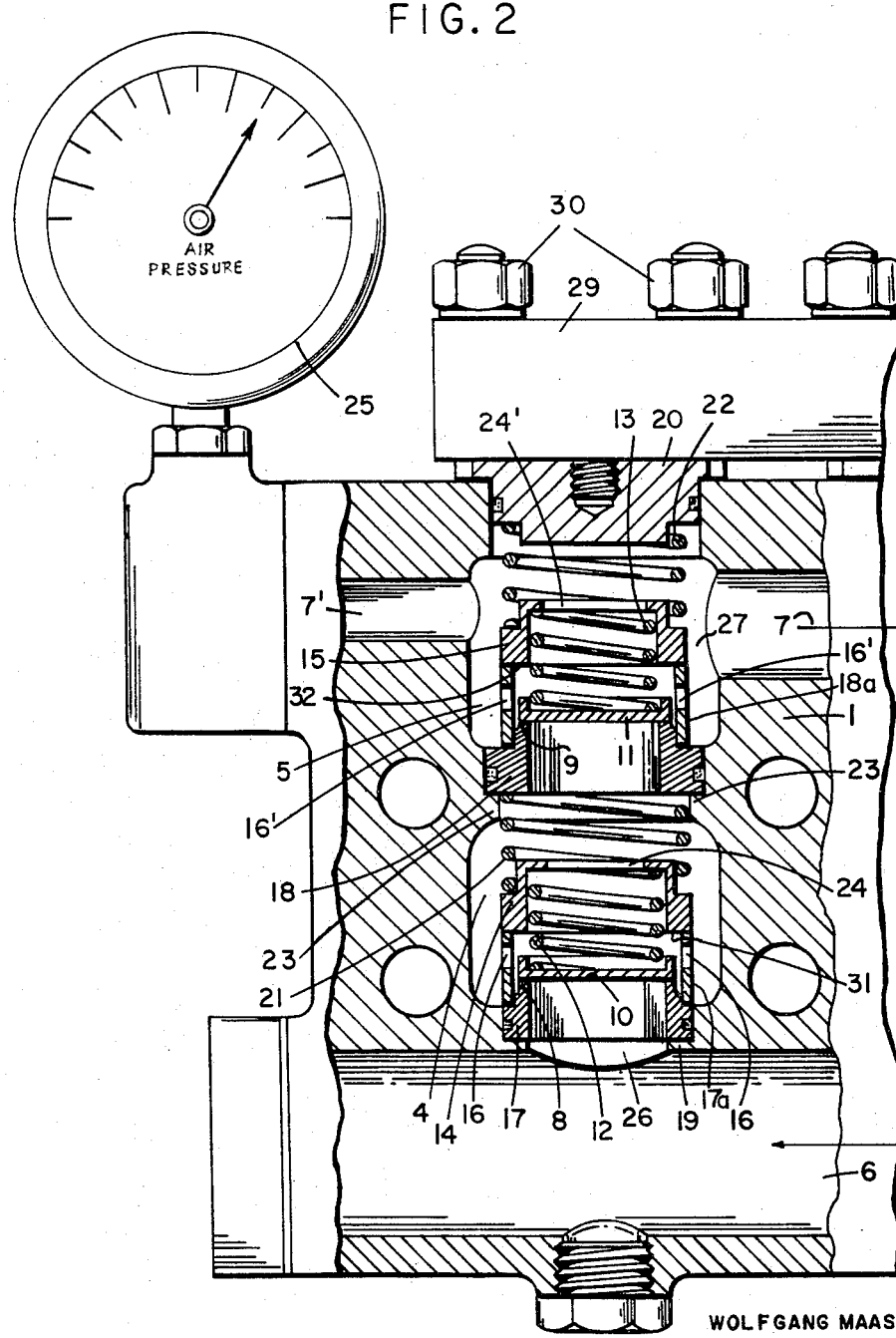

United States Patent Office 3,415,271
Patented Dec. 10, 1968

3,415,271
VALVE ASSEMBLY FOR RECIPROCATING PUMPS AND THE LIKE
Wolfgang Maasberg, Duisburg, and Willy Heinrich, Rheinkamp-Repelen, Germany, assignors to Firma Woma-Apparatebau Wolfgang Maasberg & Co. GmbH, Rheinhausen, Germany, a corporation of Germany
Filed Dec. 17, 1965, Ser. No. 514,540
Claims priority, application Germany, Aug. 19, 1965, W 39,762
4 Claims. (Cl. 137—512)

ABSTRACT OF THE DISCLOSURE

Valve assembly with a stack formed by a first sleeve, a first collar, a first loading spring, a second sleeve, a second collar and a second loading spring disposed in a generally cylindrical housing with a lower port, an upper port and an intermediate port, the latter leading to a piston cylinder and communicating alternately with the lower and upper ports through lateral apertures in the two sleeves upon a lifting of respective valve disks from seats within the sleeves against the pressure of associated biasing springs which are weaker than the corresponding loading springs.

---

Figure 1:
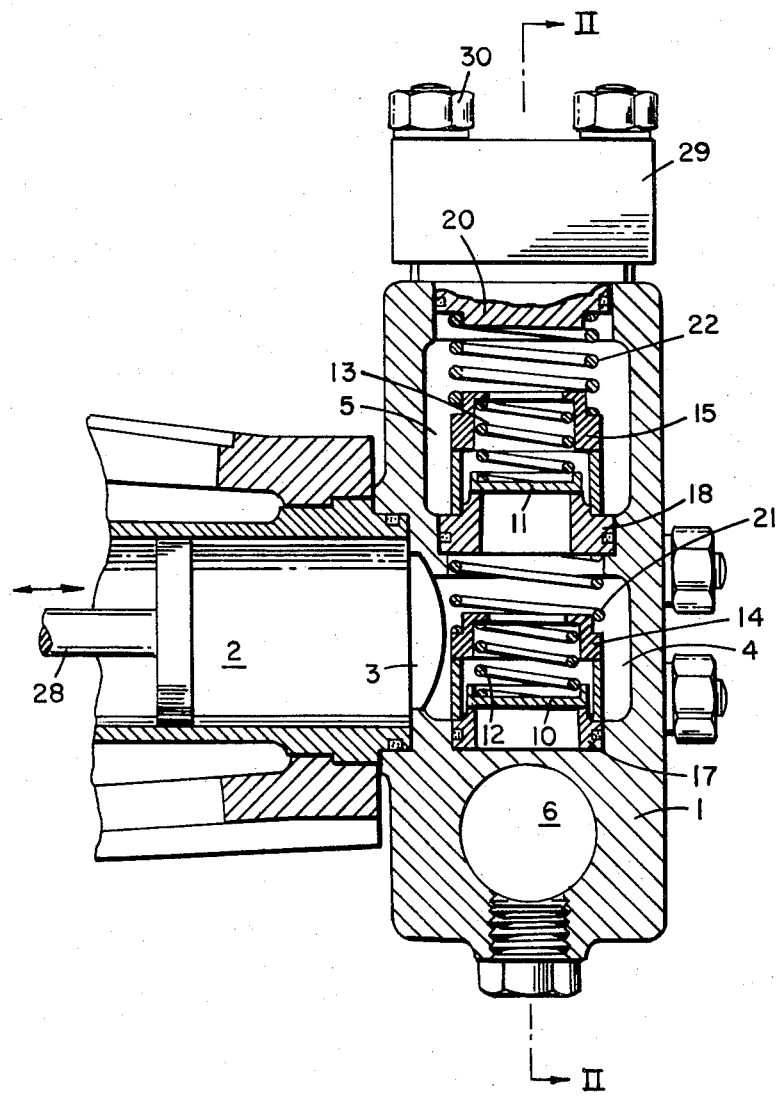

Our present invention relates to a valve assembly for use with a source of alternately low and high pressures, such as a reciprocating pump, in order to switch an outlet end of such source between a low-pressure conduit and a high-pressure conduit for the purpose of aspirating air or some other fluid from the former and forcibly delivering it to the latter.

In an assembly of this type it is customary to dispose a first valve member between the pump connection and the low-pressure port of a preferably cylindrical housing and to dispose a second valve member between the pump connection and the high-pressure port of that housing, these valve members being so seated and spring-loaded in the housing that the first one opens only on the suction stroke and the second one opens only on the compression stroke of the associated pump. If these strokes are to follow one another in rapid succession, the valve members may not close in time to prevent the leakage of part of the high-pressure fluid from the discharge port back to the pump cylinder on the suction stroke and/or the return of some fluid from the pump cylinder to the intake port during the compression stroke, thereby diminishing the efficiency of the system.

It is therefore, the general object of our present invention to provide an improved valve assembly of the general character described in which a reversal of the pump pressure practically instantly closes the open valve so that this loss of efficiency is minimized or eliminated.

Another object of this invention is to provide safety means for the rapid equalization of abnormal pressure differentials independently of the throttling effect of restricted valve apertures normally used for the circulation of the pumped fluid.

In accordance with this invention we provide for the presence of a first and a second sleeve within the valve housing, the first sleeve having one end open toward the low-pressure port and having another end open toward a first chamber communicating with the pump connection whereas the second sleeve has one end open toward the same chamber and another end open toward a second chamber communicating with the high-pressure port. The two valve members normally rest on seats formed in these sleeves and, in addition, co-operate with stop means forming abutments therefor toward which the valve members are displaceable against the force of respective biasing springs in response to pressure differentials developed between the pump connection and the two ports. Each sleeve has one or more lateral apertures communicating with the respective chambers and opening toward the first-mentioned end of the sleeve, i.e. the one facing either the low-pressure port or the first chamber, in the off-normal position of the respective valve member in which the latter is lifted from its seat and contacts the associated abutment. Since the valve member in this off-normal position is directly exposed to the atmosphere of the respective chamber through the other end of its sleeve, the fluid pressure prevailing in that chamber will be fully effective to return the valve member to its seat as soon as the counteracting pressure at the first end of the sleeve, i.e. at the low-pressure port in the case of the first valve and the pump connection in the case of the second valve, has been reduced below the pressure at the other end of the sleeve, i.e. that of the pump connection and first chamber in the case of the first valve and that of the high-pressure port and second chamber in the case of the second valve.

The two sleeves are advantageously disposed in coaxial alignment with each other within the surrounding housing, separated from each other by an internal annular shoulder of the housing which supports the second sleeve and is axially spaced from another annular shoulder supporting the first sleeve, the pump connection entering the housing between these shoulders. This arrangement results in a very compact construction of the valve assembly.

Another advantageous feature of our invention, desiged to facilitate the escape of high-pressure fluid upon the occurrence of abnormally high pressure differentials or in the event that the lateral sleeve armatures should become obstructed, resides in the provision of a pair of collars which constitute coaxial extensions of the two sleeves and are held in contact therewith by loading springs stronger than the biasing springs of the associated valve members, these biasing springs bearing upon inner formations of the collars. The loading springs are braced against the housing by extending beyond their respective collars across part of the associated chambers and have spaced-apart turns so as not unduly to obstruct the flow of fluid into and out of the collars and sleeves. In a preferred arrangement, the loading spring for the collar of the first valve bears upon the sleeve of the second valve so as to tend to lift it off its supporting shoulder, the loading spring for the collar of the second valve resisting this displacement of the sleeve thereof and bearing upon end wall of the housing which may be a removable lid giving access to the valve assembly. The sleeves, collars and loading springs thus form a continuous stack which can be readily diassembled, e.g. for the purpose of replacing one or both of the disk-shaped valve members.

Our invention will be described in greater detail with reference to the accompanying drawing in which:

FIG. 1 is an axial sectional view of a valve assembly representing an embodiment of this invention; and FIG. 2 is a similar view taken on the line II—II of FIG. 1.

The valve assembly shown in the drawing comprises a generally cylindrical housing 1 having a lower port 26, an upper port 27 and an intermediate port 3, the latter forming a connection between the interior of the housing and a source of alternating high and low pressure represented by a pump cylinder 2 with a reciprocating piston 28. Lower port 26 is an intake for low-pressure fluid and communicates with a duct 6. Upper port 27 is an outlet for high-pressure fluid communicating with a duct 7. Either or both ducts, which could also form part of a closed circulation system, may lead to a suitable load (not shown) served by the reciprocating pump 2, 28. An extension 7' of duct 7 on the opposite side of the housing terminates at a manometer 25.

The interior of housing 1 is divided into a first chamber 4, directly communicating with pump connection 3, and a second chamber 5, opening immediately into the high-pressure port 27. Housing 1 is formed with a first internal annular shoulder 19 at the bottom of chamber 4 and with a second, similar shoulder 23 at the bottom of chamber 5, these two shoulders respectively supporting a first sleeve 17 forming a valve seat 8 and a second sleeve 18 forming a valve seat 9. A disk-shaped first valve member 10 and a similarly shaped second valve member 11 respectively rest on the valve seats 8, 9 against which they are urged by biasing springs 12 and 13. Spring 12 abuts an annular inner shoulder 24 of a collar 14, spring 13 bearing in an analogous manner upon a similar shoulder 24' of a collar 15. A first loading spring 21, stronger than spring 12, presses the collar 14 against an extension 17a of sleeve 17 and bears from below on sleeve 18; a second loading spring 22, stronger than spring 13, presses the collar 15 onto an extension 18a of sleeve 18 and bears from below upon a lid 20 removably fastened to the housing by a pressure bar 29 and screws 30. The undersides 31, 32 of collars 14 and 15 form abutments for the valve disks 10 and 11 in their off-normal, raised positions.

The turns of coil springs 21 and 22 are spaced apart to a sufficient extent to permit virtually unhindered passage of air between chambers 4, 5 and the bores of collars 14, 15, respectively. These bores, in addition, communicate with the respective chambers 4 and 5 via lateral apertures 16, 16', formed in extensions 17a, 18a of sleeves 17 and 18, as long as the associated valve disks 10 and 11 rest on their seats 8 and 9. When the disks are lifted off their seats by an upwardly acting pressure differential developed thereacross, the apertures 16 and 16' respectively connect chamber 4 with duct 6 and chamber 5 with cylinder 2.

In operation, a suction stroke of piston 28 (to the left in FIG. 1) reduces the pressure above valve disk 10 until the latter is lifted off its seat 8 against the biasing force of spring 12. When the disk 10 strikes the underside 31 of collar 14, apertures 16 establish communication between pump cylinder 2 and duct 6 whereby fluid from the latter may enter that cylinder. When the stroke of piston 28 is thereafter reversed, the increased pressure in chamber 4 is communicated to the disk 10 through the wide-open passage formed by the spaces between the turns of spring 21 and by the entrance end 24 of collar 14, independently of aperture 16, so that the disk instantly returns to its normal position on the seat 8, thus shutting off the connection between port 3 and duct 6. As the pressure in chamber 4 builds up to a value greater than that of the pressure prevailing in duct 7 and chamber 5, valve disk 11 is raised off its seat 9 against the force of its biasing spring 13 and, on contacting the underside 32 of collar 15, unblocks the apertures 16' to give access to the discharge port 27 through which the fluid from cylinder 2 can now flow into duct 7. At the beginning of the next suction stroke, valve disk 11 immediately snaps back onto its seat 9 as the pressure in chamber 4 is reduced and the pressure in duct 7 and chamber 5 acts upon the upper disk surface through the wide-open passage afforded by the spacing of the turns of spring 22 and by the entrance end 24' of collar 15, independently of apertures 16'.

It will be noted that sleeves 17 and 18, collars 14 and 15 as well as springs 21 and 22 form a continuous stack lodged under pressure between the lower shoulder 19 and the lid 20 of the housing, independently of the upper shoulder 23 which merely forms a back stop for the sleeve 18. If, e.g. as a result of a venting of duct 7, an abnormally large pressure differential should develop across the disk 11, this pressure may be rapidly equalized by a raising of the disk together with collar 15 above sleeve 18, against the force of spring 22, so that the apertures 16' would be bypassed and their throttling effect would be eliminated. The same situation would exist with reference to the lower valve assembly 10, 14, 21 if an abnormally high pressure differential should develop across disk 10, e.g. as a result of the collapse of a partial vacuum in duct 6 upon a venting of the latter.

The system herein disclosed, with its improved safety features just described, may be used with either gaseous or liquid fluids. The ducts 6 and 7 may also be regarded as the low-pressure side and the high-pressure side of a pump interconnected by a bypass containing a pressure-relief valve of the type disclosed in commonly owned application Ser. No. 464,055, filed June 15, 1965, by Willy Heinrich.

We claim:

1. A valve assembly having a generally cylindrical housing with a low-pressure port, a high-pressure port and a connection between said ports leading to a region of alternating low and high pressures, comprising:

a first chamber in said housing communicating with said connection;

a second chamber in said housing communicating with said high-pressure port;

a first sleeve having one end open toward said low-pressure port and another end open toward said first chamber;

a second sleeve having one end open toward said first chamber and another end open toward said second chamber, said sleeves being coaxially disposed in said housing;

means in said first and second sleeves forming first and second valve seats facing said first and second chambers, respectively;

a first and a second valve member provided with first and second spring means biasing same into contact with said first and second valve seats, respectively;

and stop means in said first and second sleeves forming abutments for said first and second valve members, respectively, said stop means comprising first and second collars and first and second loading springs stronger than said first and second spring means holding said first and second collars in contact with said first and second sleeves, respectively, as coaxial extensions thereof, said first and second spring means bearing upon said collars, said valve members being displaceable against the force of their associated spring means into off-normal positions in contact with said abutments in response to pressure differentials developed between said connection and said ports, said sleeves each having at least one lateral aperture communicating with the respective chamber and opening toward said one end thereof in the off-normal position of the respective valve member, said housing forming a first supporting surface engaged by said first sleeve and a second supporting surface engaged by said second loading spring;

said first sleeve, first collar, first loading spring, second sleeve, second collar and second loading spring forming a continuous stack interposed under the pressure of said loading springs between said supporting surfaces, said loading springs being coils with spaced-apart turns extending beyond said collars across part of said first and second chambers, respectively.

2. A valve assembly as defined in claim 1 wherein said first supporting surface is a first internal annular shoulder surrounding said low-pressure port, said housing being formed with a second internal annular shoulder axially spaced from said first collar and supporting said second sleeve against the force of said second loading spring, said first loading spring passing freely through said second shoulder.

3. A valve assembly as defined in claim 2 wherein said second supporting surface is a removable lid on said housing giving access to said stack.

4. A valve assembly defined in claim 2 wherein said connection enters said housing between said first and second shoulders.

References Cited

UNITED STATES PATENTS

| | | | |
|---|---|---|---|
| 1,405,525 | 2/1922 | Le Cain | 230—231 X |
| 1,799,704 | 4/1931 | Riley | 137—512 X |
| 1,949,208 | 2/1934 | King | 137—512 |
| 2,630,294 | 3/1953 | Ericson et al | 137—512 X |
| 2,649,277 | 8/1953 | Blackford | 137—543.19 X |
| 3,030,978 | 4/1962 | Griffith et al. | 137—512 |
| 3,084,709 | 4/1963 | Flick et al. | 137—543.19 X |

WILLIAM F. O'DEA, *Primary Examiner.*

D. ZOBKIW, *Assistant Examiner.*

U.S. Cl. X.R.

137—543.19